Feb. 11, 1941.                A. B. FREITAS                2,231,805
                          DIAL INDICATOR EXTENSION
                            Filed Nov. 18, 1939
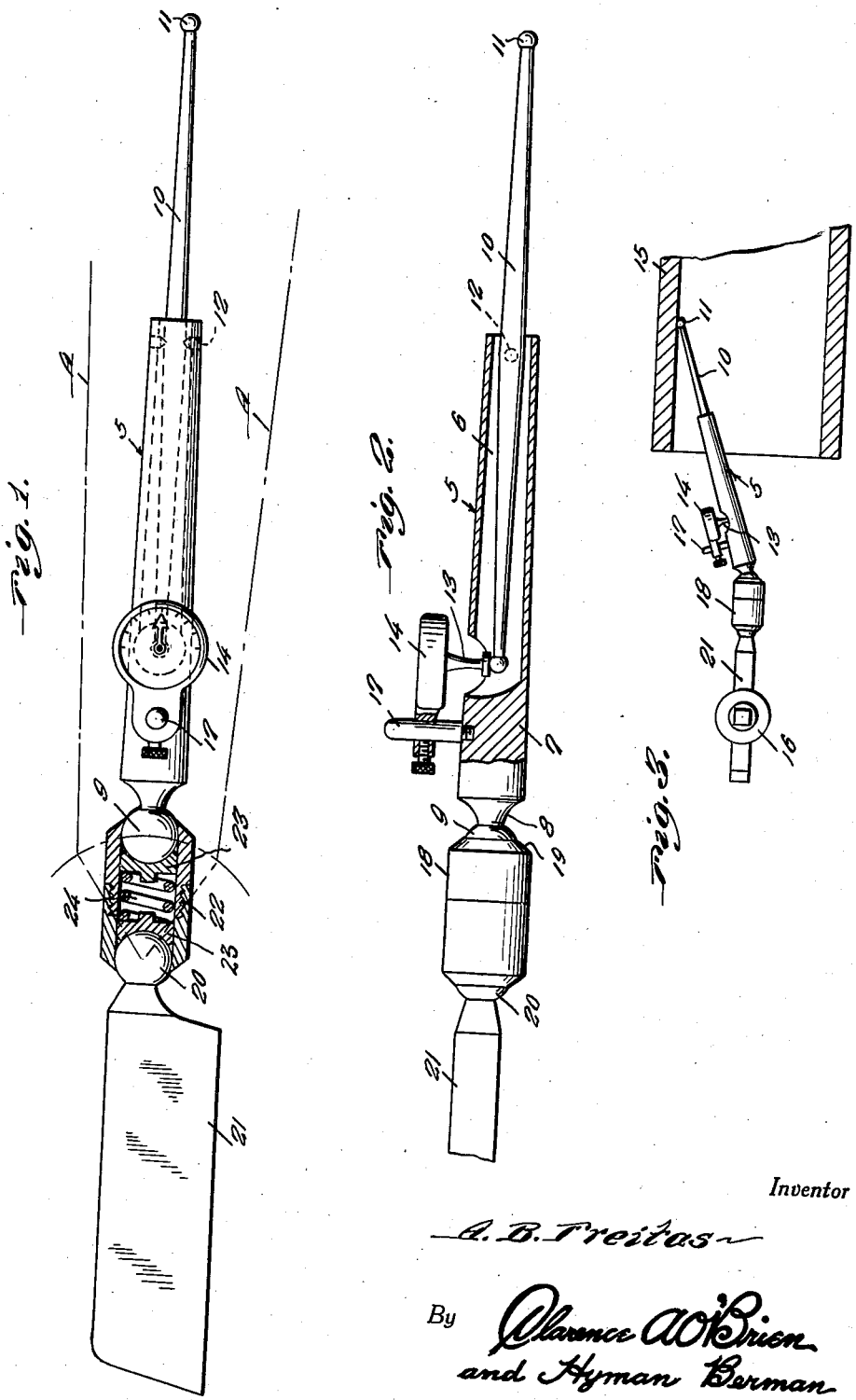
Inventor
*A. B. Freitas*
By *Clarence A. O'Brien*
and *Hyman Berman*
                                              Attorneys Patented Feb. 11, 1941

2,231,805

UNITED STATES PATENT OFFICE 2,231,805

DIAL INDICATOR EXTENSION

Albert B. Freitas, Honolulu, Territory of Hawaii

Application November 18, 1939, Serial No. 305,150

1 Claim. (Cl. 33—172)

This invention relates to a dial indicator extension especially adapted to permit successful use of a conventional dial indicator for gauging deep bores of jobs on a lathe, and has for the primary object the provision of a device of this character which may be readily mounted on a lathe by being secured to the tool post of said lathe and provides a support and actuating means for a dial type gauge wherein gauging of bores may be accurately carried out wherein the bores vary as to depth and diameter and of considerable depth not easily gauged through the use of the dial gauge alone and which may be adjusted to different angular positions with respect to the tool post and made to swing in the arc of a circle to readily follow out the surfaces of the bore.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a top plan view, partly in section, illustrating a dial indicator extension constructed in accordance with my invention.

Figure 2 is a side elevation, partly in section, illustrating the same.

Figure 3 is a top plan view, partly in section, illustrating the extension supporting a dial indicator on a tool post and operating in a bore.

Referring in detail to the drawing, the numeral 5 indicates a supporting member, a portion of which is of tubular formation, as shown at 6, and the remaining portion of solid formation as indicated at 7 and terminating in a reduced shank 8 on which is formed a ball 9. A feeler arm 10 having a ball 11 at each end is pivotally mounted intermediate its ends within the tubular portion 6 of the member 5, as indicated at 12. It will be seen that the pivot 12 is located in close proximity to the open end of the tubular portion 6. The other end of the tubular portion opens outwardly through a wall of the member 5 to permit an operating finger 13 of a dial gauge 14 to contact the ball 11 at one end of the feeler arm, the other ball of the feeler arm being located a considerable distance from the open of the tubular portion of the member 5 so as to enter a bore of a member or job 15 being acted upon on a lathe, the tool post thereof being indicated by the character 16.

The dial indicator may be of any well known type and is detachably and adjustably mounted on the member 5 through the use of a post 17 threaded in a socket provided in the solid portion 7 of the member 5.

A sleeve 18 has tapered or restricted ends 19 to receive in one of said ends the ball 9 while a ball 20 is received in the other end and forms an integral part of an attaching medium 21 adapted to be clamped in the tool post 16 of the lathe. The casing 18 is of sectional formation being threaded together, as shown at 22. The restricted ends of the casing 18 permit rotation of the balls 20 and 9 as well as permitting a pivotal movement of the ball. Followers 23 engage with the balls 9 and 20 and are spring influenced by an expansible coil spring 24 arranged therebetween and confined within the casing.

In operation, the member 21, as before stated, is mounted in the tool post of the lathe and the feeler arm 10 enters the bore of the job on the lathe. The casing may be moved to assume the angular positions as indicated by the lines A in Figure 1, by pivoting on the ball 20 and the member 5 and feeler arm 10 may be caused to swing in the arc of a circle by the ball 9 pivoting in the casing when in any of its angular positions so as to readily follow out the surface of the bore. Also it will be seen that the ball 9 is rotatable in the sleeve which will permit the member 5 to be turned over to bring the dial in various positions for convenient reading. Through the use of this present invention it will be seen that gauging bores of considerable depth may be easily and accurately carried out through the use of a conventional type of gauge.

It is believed that the foregoing description, when taken in connection with the drawing will fully set forth the construction and advantages of this invention to those skilled in the art to which such device relates, so that further detailed description will not be required.

Having thus described by invention, what I claim is:

In a device of the character described comprising a member including a tubular portion having an opening in one side thereof, a feeler arm extending into the tubular portion and pivotally connected thereto, means for mounting a dial gauge on said member to contact one end of the feeler arm by way of said opening, a ball formed on the inner end of said member, a sectional casing receiving said ball for rotatable and pivotal movement, a supporting member having a ball at one end located in the casing for pivotal movement, followers in the casing, spring means in the casing for pressing the followers against the balls and means for detachably connecting together the two sections of the casing.

ALBERT B. FREITAS.